United States Patent
Vickers et al.

(10) Patent No.: US 12,335,130 B2
(45) Date of Patent: Jun. 17, 2025

(54) NETWORK PATH TESTING VIA INDEPENDENT TEST TRAFFIC

(71) Applicant: Graphcore Limited, Bristol (GB)

(72) Inventors: Martin Vickers, Bristol (GB); Bjorn Dag Johnsen, Oslo (NO); Brian Edward Manula, Bekkestua (NO); Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 484 days.

(21) Appl. No.: 17/823,578

(22) Filed: Aug. 31, 2022

(65) Prior Publication Data

US 2023/0080535 A1 Mar. 16, 2023

(30) Foreign Application Priority Data

Sep. 10, 2021 (GB) ...................................... 2112901

(51) Int. Cl.
*H04L 43/50* (2022.01)

(52) U.S. Cl.
CPC .......... *H04L 43/50* (2013.01); *H04L 2212/00* (2013.01)

(58) Field of Classification Search
CPC ............................ H04L 43/50; H04L 2212/00
See application file for complete search history.

(56) References Cited

U.S. PATENT DOCUMENTS

| | | | |
|---|---|---|---|
| 11,303,551 B2* | 4/2022 | Mirsky | ............... H04L 41/0631 |
| 2007/0076616 A1 | 4/2007 | Ngo | |
| 2007/0233847 A1 | 10/2007 | Aldereguia | |
| 2011/0299409 A1* | 12/2011 | Vobbilisetty | ............ H04L 45/66 370/252 |
| 2014/0293799 A1* | 10/2014 | Park | .................... H04L 41/5009 370/242 |
| 2017/0366442 A1* | 12/2017 | Marelli | ................... H04L 49/25 |
| 2019/0182141 A1* | 6/2019 | Shih | .................... H04L 43/0852 |

OTHER PUBLICATIONS

Examination Report dated Mar. 19, 2024 for United Kingdom Patent Application No. GB2112901.0.
Combined Search and Examination Reported dated Jun. 1, 2022 for United Kingdom Patent Application No. GB2112901.0.
Examination Reported dated Oct. 19, 2023 for United Kingdom Patent Application No. GB2112901.0.

* cited by examiner

*Primary Examiner* — Chi H Pham
*Assistant Examiner* — Weibin Huang
(74) *Attorney, Agent, or Firm* — HAYNES AND BOONE, LLP

(57) ABSTRACT

The same test data frame is dispatched from a network interface device a plurality of times so as to test a network. Since the same test data frame is used, it may be unnecessary for a new test data frame to be provided and protocol processed each time one is required to be sent. The protocol processing resources of the network interface device are then available for sending further traffic in parallel with the dispatch of the test data frames. On the receive side, the network interface device collects statistics regarding the reliable receipt of test frames, without requiring the test frames to be further processed and provided to a driver of the network interface device. In this way, the processing and buffering capacity in the network interface device is available for handling further traffic in parallel with the test traffic.

23 Claims, 10 Drawing Sheets

NETWORK PATH TESTING VIA INDEPENDENT TEST TRAFFIC

CROSS-REFERENCE TO RELATED APPLICATIONS

The present application claims priority to United Kingdom Patent Application No. GB2112901.0, filed Sep. 10, 2021, the disclosure of which is hereby incorporated herein by reference in its entirety.

TECHNICAL FIELD

The present application relates to a network interface device, and in particular to a network interface device for sending and receiving test data frames over the network to test the network.

BACKGROUND

In the context of processing data for complex or high volume applications, a processing unit for performing the processing of that data may be provided. The processing unit may function as a work accelerator to which the processing of certain data is offloaded from a host system. Such a processing unit may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a processing unit specialised for machine intelligence applications may comprise a large degree of multi-threading. One form of parallelism can be achieved by means of an arrangement of multiple tiles on the same chip (i.e. same die), each tile comprising its own separate respective execution unit and memory (including program memory and data memory). Thus separate portions of program code can be run in parallel on different ones of the tiles.

In order to increase processing capacity, a plurality of processing units may be connected together to provide a scaled system. In some cases, such processing units may be connected together remotely over a packet switched network, e.g. over an Ethernet network. To provide for communications over such a network, network interface devices associated with the processing units may be provided.

When exchanging data packets over a network, testing of that network may be performed in order to ensure that the paths over the network, through one or more switches, are able to reliably carry network traffic. Such testing of the network enables a determination of whether or not there are any bad links in the network between the source and the destination.

SUMMARY

One issue with current proposals for testing a network is that the sending of test traffic over a network may require the consumption of processing resources (e.g. of drivers and of the network interface device) used to produce the test data frames for dispatch over the network. Such processing resources, if in use for sending test traffic, may be unavailable for sending application traffic, hence preventing applications from communicating over the network whilst testing is underway.

According to a first aspect, there is provided a network interface device for interfacing one or more data processing components with a network, the network interface device comprising: a transmit buffer for storing a test data frame for dispatch over the network for testing the network; a send count register configured to store a send count value representing a number of times the test data frame is to be dispatched from the transmit buffer over the network; and processing circuitry configured to: cause the test data frame to be dispatched over the network the number of times specified in the send count register; perform network protocol processing to produce further traffic for dispatch over the network; and prior to completing the sending of the test data frame the number of times specified in the send count register, cause the further traffic to be dispatched over the network, wherein the causing the test data frame to be dispatched comprises causing at least one of the test data frames to be dispatched whilst the network protocol processing is being performed.

The same test data frame is dispatched from the network interface device a plurality of times as required to provide for sufficient testing of the network. Since the same test data frame is used, it may be unnecessary for i) a driver associated with the network interface device to provide a new test data frame each time one is required to be sent, which would consume processing resources of the driver; and ii) perform protocol processing at the network interface to produce a new test data frame each time one is required to be sent. The protocol processing resources of the network interface device are then available for sending further traffic—e.g. data traffic sent over a connection or datagram traffic—in parallel with the dispatch of the copies of the test data frame.

In some embodiments, the network interface device comprises an interface connected to the one or more data processing components, wherein the interface is configured to receive at least part of the test data frame from at least one of the one or more data processing components.

In some embodiments, the receiving at least part of the test data frame from the at least one of the one or more data processing components comprises receiving one or more write packets from the at least one of the one or more data processing components, wherein the at least part of the test data frame is contained in payloads of the one or more write packets.

In some embodiments, the at least part of the test data frame comprises: a payload of the test data frame; and at least part of a link layer header of the test data frame.

In some embodiments, the further traffic comprises a plurality of datagrams, wherein the network interface device further comprises a second buffer for storing the plurality of datagrams prior to the network protocol processing.

In some embodiments, the interface is configured to receive each of the plurality of datagrams from the one or more data processing components.

In some embodiments, the network interface device comprises an interface connected to the one or more data processing components, wherein the interface is configured to receive one or more write packets for forming frames of the further traffic, the network protocol processing including encapsulating the one or more write packets to form the frames of the further traffic.

In some embodiments, the processing circuitry is configured to complete the test data frame by providing an error detection code for the test data frame.

In some embodiments, the one or more data processing components comprises a processor, wherein the send count register is writable by the processor, wherein the network interface device comprises an interface configured to receive at least part of the test data frame from the processor.

In some embodiments, the test data frame comprises a datagram.

According to a second aspect, there is provided a network interface device for interfacing one or more data processing components with a network, the network interface device comprising: a receive count register configured to store a receive count value representing a number of test data frames that have been correctly received from over the network; and processing circuitry configured to: upon receipt of a first of the test data frames, check the first of the test data frames using error detection code contained in the first of the test data frames; in response to determining that the first of the test data frames has passed the check, update the receive count value; after performing the updating of the receive count value for the first of the test data frames, discard the first of the test data frames; receive further traffic from the network, wherein at least part of the further traffic is received after receipt of at least one of the test data frames; and perform network protocol processing of the further traffic received from over the network, wherein the receipt of the first of the test data frames occurs whilst the network protocol processing of the further traffic is being performed.

The network interface device implements a receive count register, storing a receive count value for counting the number of test data frames after performing a check using the error detection code. This functionality enables the network interface device to collect statistics regarding the reliable receipt of test frames without requiring the test frames to be further processed and provided to a driver of the network interface device. In this way, the processing and buffering capacity in the network interface device is available for handling further traffic. Furthermore, the driver processing capacity is not consumed by the counting of the test data frames.

In some embodiments, the processing circuitry is configured to: examine an indication in a header of the first of the test data frames, the indication indicating that the first of the test data frames is test traffic; and in response to the indication in the header of the first of the test data frames, process the first of the test data frames as test traffic by performing the step of updating the receive count value.

In some embodiments, the test data frames are Ethernet frames, wherein the indication in the header comprises an Ethertype, wherein the further traffic comprises frames of a different Ethertype.

In some embodiments, each of the test data frames are copies of a same test data frame.

In some embodiments, the further traffic comprises a plurality of datagrams.

In some embodiments, the network protocol processing comprises at least link layer protocol processing to extract packets from frames of the further traffic.

In some embodiments, each of the test data frames comprises a datagram.

In some embodiments, the further traffic is connection oriented traffic.

According to a third aspect, there is provided an integrated circuit comprising the network interface device of either the first aspect or the second aspect, wherein the integrated circuit comprises the one or more data processing components.

According to a fourth aspect, there is provided a method for testing a network whilst transmitting further traffic over the network, the method implemented in a network interface device for interfacing one or more data processing components with the network, the method comprising: storing a send count value representing a number of times a test data frame is to be dispatched from the network interface device over the network; causing the test data frame to be dispatched over the network the number of times specified in the send count register; performing network protocol processing to produce the further traffic for dispatch over the network; and prior to completing the sending of the test data frame the number of times specified in the send count register, causing the further traffic to be dispatched over the network, wherein the causing the test data frame to be dispatched comprises causing at least one of the test data frames to be dispatched whilst the network protocol processing is being performed.

According to a fifth aspect, there is provided a computer program comprising computer readable instructions, which when executed by a processor of a network interface device, cause a method for testing a network whilst transmitting further traffic over the network to be performed, the method comprising: storing a send count value representing a number of times a test data frame is to be dispatched from the network interface device over the network; causing the test data frame to be dispatched over the network the number of times specified in the send count register; performing network protocol processing to produce the further traffic for dispatch over the network; and prior to completing the sending of the test data frame the number of times specified in the send count register, causing the further traffic to be dispatched over the network, wherein the causing the test data frame to be dispatched comprises causing at least one of the test data frames to be dispatched whilst the network protocol processing is being performed.

According to a sixth aspect, there is provided a method for processing test traffic received from over a network, whilst also processing further traffic received from over the network, the method implemented in a network interface device for interfacing one or more data processing components with the network, the method comprising: upon receipt of a first of a plurality of test data frames, checking the first of the test data frames using error detection code contained in the first of the test data frames; in response to determining that the first of the test data frames has passed the check, updating a receive count value, the receive count value representing a number of the test data frames that have been correctly received from over the network, after performing the updating of the receive count value for the first of the test data frames, discarding the first of the test data frames; receiving the further traffic from the network, wherein at least part of the further traffic is received after receipt of at least one of the test data frames; and performing network protocol processing of the further traffic received from over the network, wherein the receipt of the first of the test data frames occurs whilst the network protocol processing of the further traffic is being performed.

According to a seventh aspect, there is provided a computer program comprising computer readable instructions, which when executed by a processor of a network interface device, cause a method for processing test traffic received from over a network, whilst also processing further traffic received over the network, to be performed, the method comprising: upon receipt of a first of a plurality of test data frames, checking the first of the test data frames using error detection code contained in the first of the test data frames; in response to determining that the first of the test data frames has passed the check, updating a receive count value, the receive count value representing a number of the test data frames that have been correctly received from over the network, after performing the updating of the receive count value for the first of the test data frames, discarding the first of the test data frames; receiving the further traffic from the network, wherein at least part of the further traffic is received after receipt of at least one of the test data frames; and performing network protocol processing of the further traffic received from over the network, wherein the receipt of the first of the test data frames occurs whilst the network protocol processing of the further traffic is being performed.

According to an eighth aspect, there is provided a non-transitory computer readable medium storing either or both of the computer programs of the fifth and seventh aspects.

BRIEF DESCRIPTION OF DRAWINGS

For a better understanding of the present invention and to show how the same may be carried into effect, reference will now be made by way of example to the accompanying Figures in which.

DETAILED DESCRIPTION

Embodiments of the application relate to the transmission and reception of test data frames over a network. These test data frames are so-called since their transmission provides for the testing of connectivity over a network used for the transmission of further traffic between devices.

Figure 1:
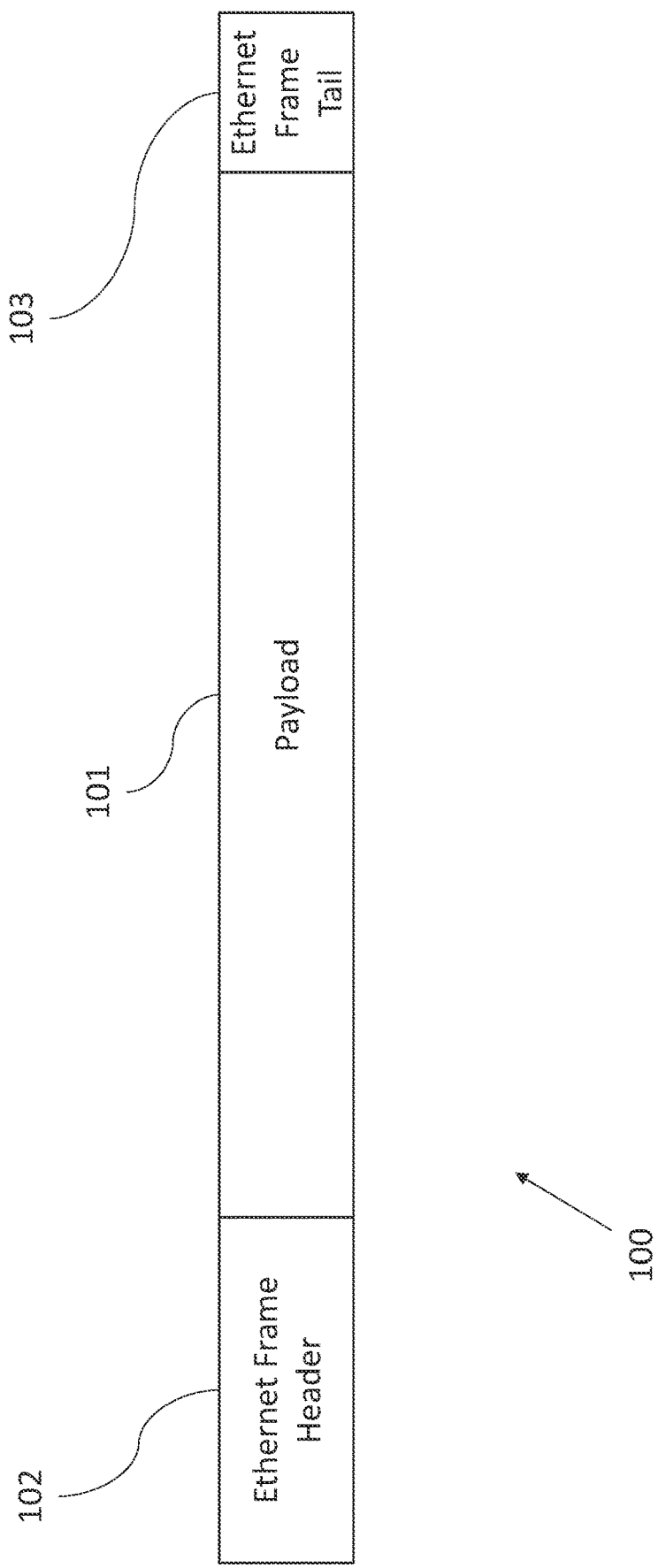
FIG. 1 illustrates an example of a data frame.

Reference is made to FIG. 1, which illustrates an example data frame 100. The example data frame 100 comprises a payload 101, to which is appended a frame header 102 and a frame tail 103. The data frame 100 is a link layer protocol data unit, with the header 102 and tail 103 being formed by link layer processing. In this example, the link layer protocol is Ethernet and the data frame 100 is an Ethernet data frame.

Figure 2:
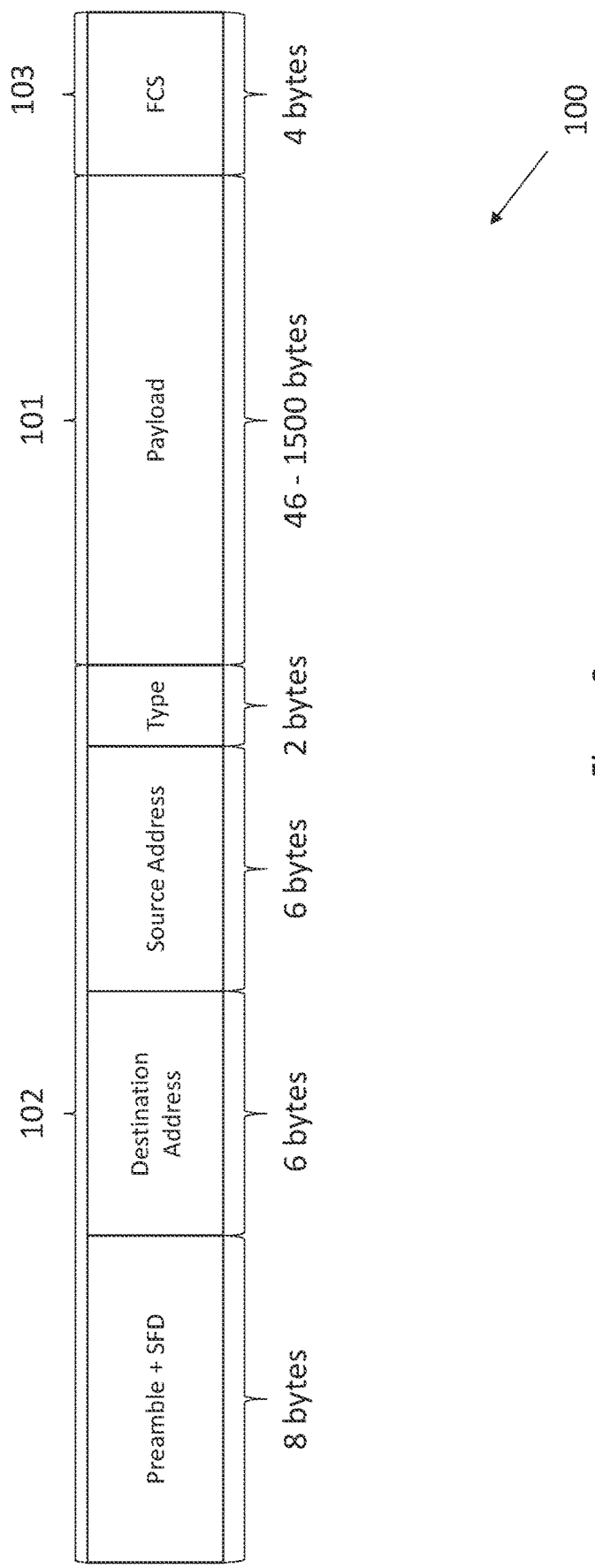
FIG. 2 illustrates an example of a data frame, including example fields of the header and tail of the data frame.

Reference is made to FIG. 2, which illustrates the header 102 and tail 103 of an example Ethernet frame in more detail.

As shown, the header 102 comprises a preamble and a start frame delimiter (SFD). This part of the frame marks the start of a new incoming frame and enables devices on the network to synchronise their receive clocks. The SFD marks the end of the preamble and indicates the beginning of the destination address.

The destination address indicates the destination to which the frame 100 is to be delivered over the network. Various switches in the network are configured to examine the destination address field to identify the endpoint to which the data frame 100 is to be delivered. The switches are configured to then route the data frame 100 to that destination. The source address identifies the device on the network from which the data frame 100 originated. In the Ethernet protocol, the destination address and the source address are referred to as medium access control (MAC) addresses.

The header 102 comprises an indication of the type of the data frame 100. This type indication is used to indicate which protocol is encapsulated in the payload 101 of the frame 100. In the Ethernet protocol, this type indication is referred to an Ethertype. In embodiments of the application, this type indication is set in the test data frames to identify those data frames as being test data frames.

The tail 103 of the frame 100 comprises a frame check sequence (FCS), which is an error-detecting code that is added to the frame as part of the link layer processing. The FCS is calculated over the header 102 and the payload 101 of the frame 100. The FCS thus provides for error detection for the entire frame. When received at a network endpoint, the FCS is checked, thus providing an indication as to whether or not the frame has been received without error.

The payload 101 of the frame comprises headers of higher layers of the protocol suite in addition to application data. However, the structure of the payload 101 may take different forms in dependence upon the protocols encapsulated within the frame 100. For example, the data units of different layers in the payload 101 may be nested within a data unit of a lower layer of the protocol suite, with the application data being provided at the highest layer in the protocol suite. Such a nested arrangement is used for data frames constructed in accordance with the Internet Protocol suite, in which case the payload 101 comprises application data contained within a transport layer data unit (e.g. a TCP segment or UDP datagram) having its own header. The transport layer data unit is itself provided as the payload of an Internet layer packet, which also has its own header.

Figure 3A:
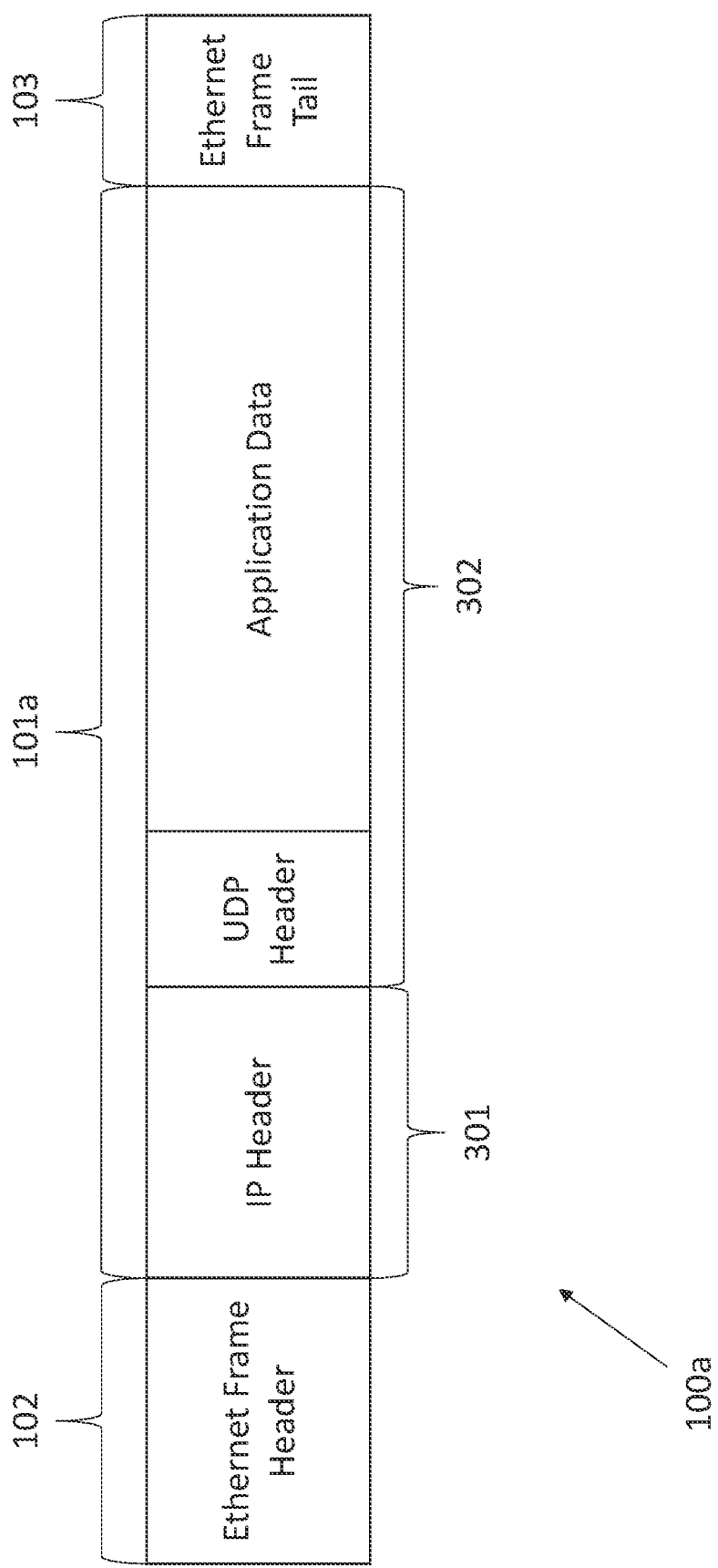
FIG. 3A illustrates an example of an Ethernet data frame comprising a UDP datagram.

Reference is made to FIG. 3A, which shows an example data frame 100a formed in accordance with protocols belonging to the Internet Protocol Suite. The data frame 100a is an Ethernet data frame and comprises an Ethernet frame header 102 and Ethernet frame tail 103. Encapsulated within the data frame 100a is an IP (Internet Protocol) packet 101a, which constitutes the payload of the frame 100a. The IP packet 101a has an IP header 301 and an IP payload 302. The IP payload 302 takes the form of a User Datagram Protocol (UDP) datagram 302, which comprises a UDP header and application data.

In embodiments of the application, data frames are used in which the payload comprises a number of data packets formed in accordance with a protocol used for network on chip (NoC) communication. These packets comprise headers suitable for routing of the packets to different components of an integrated circuit (i.e. a chip) over an interconnect implemented on that chip. Such packets are referred to herein as Elink packets.

Figure 3B:
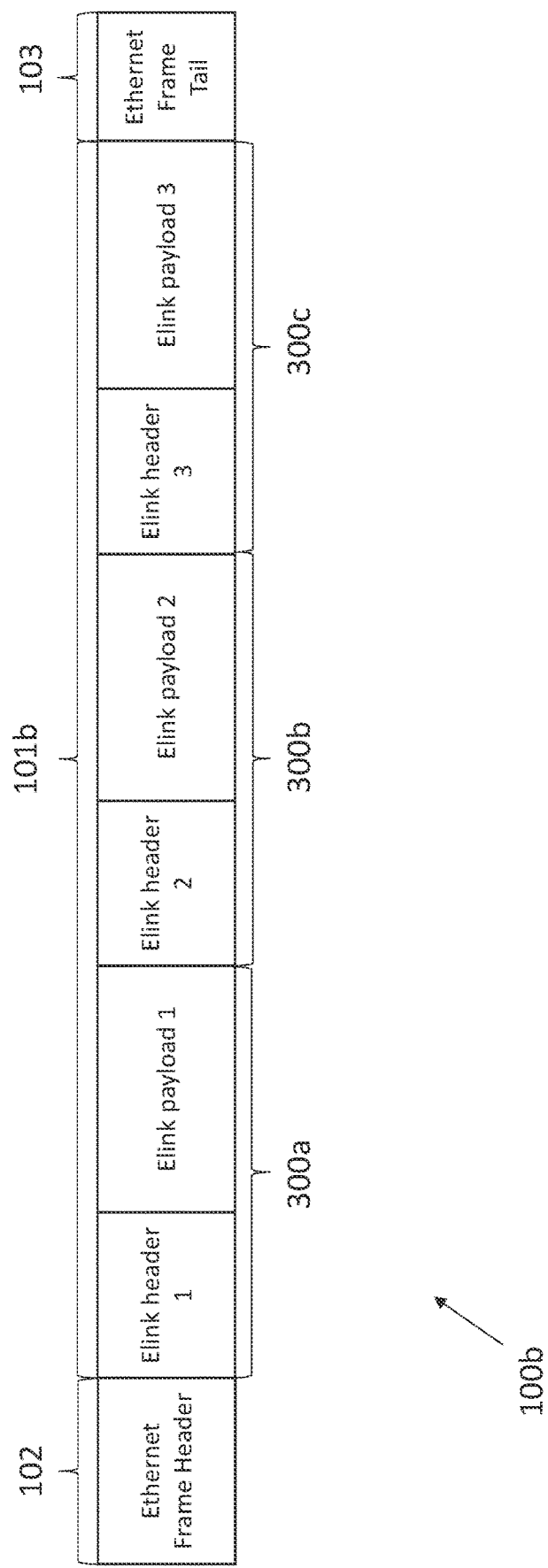
FIG. 3B illustrates an example of a data frame comprising packets formed in accordance with a protocol used for Network on Chip communication.

Reference is made to FIG. 3B, which shows another example data frame 100b. This example data frame 100b comprises a payload 101b formed using the Elink protocol used for NoC communication. The data frame 100b is an Ethernet data frame and comprises an Ethernet frame header 102 and Ethernet frame tail 103. The payload 101b comprises a plurality of Elink packets 300a, 300b, 300c. Each of the Elink packets 300a, 300b, 300c comprises a header and a payload. The header comprises a plurality of fields, including a destination ID field, identifying the destination device to which the respective packet is to be routed over the network and, additionally, identifying a location on the destination device, e.g. a component on the destination chip, to which the respective packet is to be routed. A source ID field, identifying the source device from which the packet originated, is also included in the Elink headers. The payload of an Elink packet comprises the data to be delivered to the destination component on the destination device. As shown, a plurality of Elink packets 300a, 300b, 300c are encapsulated together into a data frame for transport over the network to the destination device.

Figure 4:
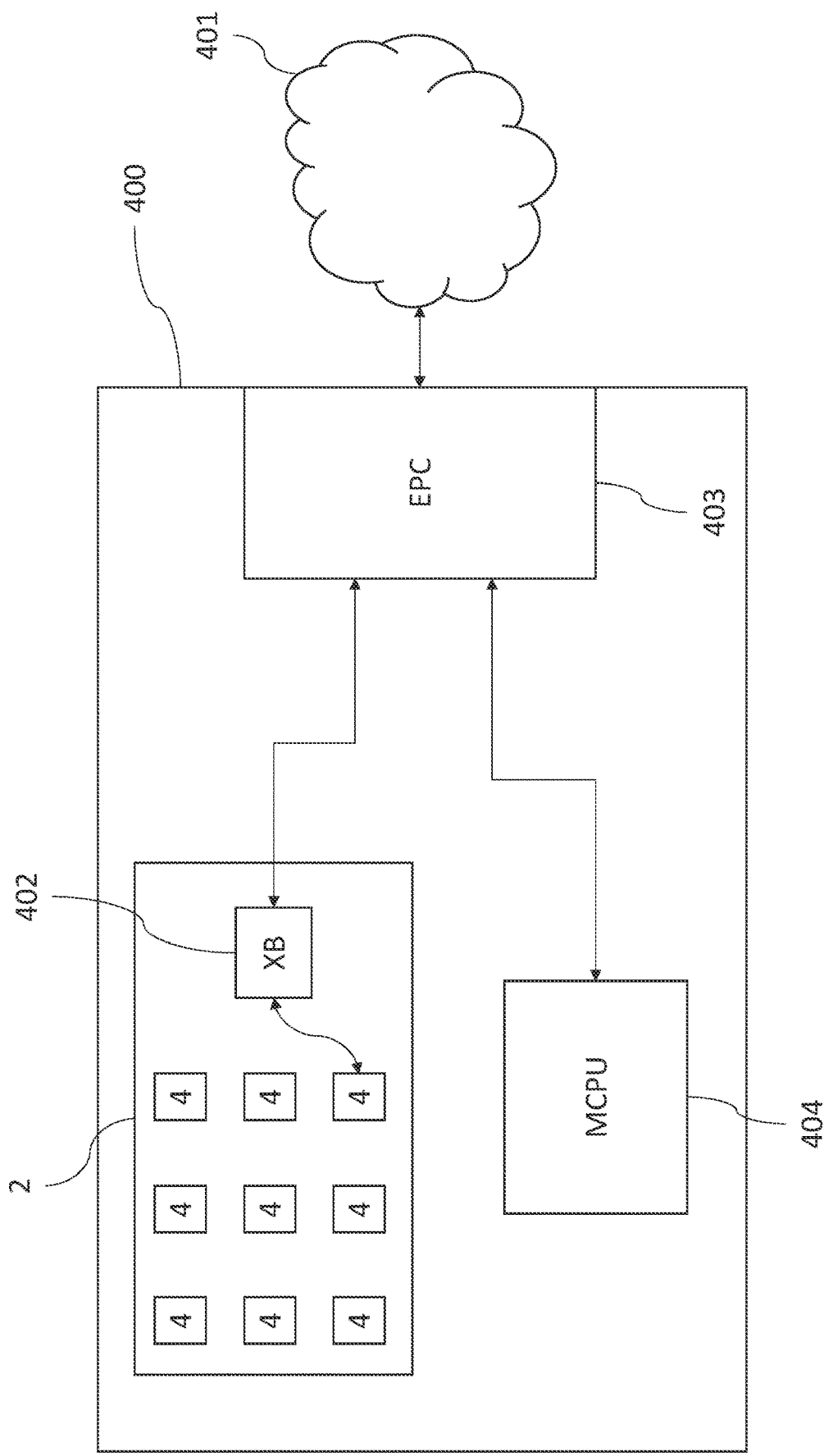
FIG. 4 illustrates a device having a plurality of processing components and a network interface device for interfacing the device with the network.

Reference is made to FIG. 4, which illustrates an example of a processing device 400 for sending data over a network 401. In embodiments, the processing device 400 takes the form of a single chip.

The processing device 400 comprises data processing components that are configured to dispatch data packets over the network 401 and are configured to receive data packets from the network 401. One such data processing component is a processing unit 2. The processing unit 2 is a multi-tile processing unit 2 comprising a plurality of tiles 4. Each such tile 4 comprises its own execution unit and memory. An example of the processing unit 2 is described in more detail in our earlier application U.S. Ser. No. 16/276,834, which is incorporated by reference.

One or more of the tiles 4 are configured to send and receive data over the network 401 by exchanging data packets with a hardware module 402 (referred to herein as an exchange block) of the processing unit 2. To send data over the network 401, a tile 4 issues one or more data packets in a first format (referred to as the TLink packet format) to the hardware module 402. Circuitry of the hardware module 402 converts each of those TLink packets to the Elink packet format. The Elink packets are sent from the hardware module 402 over an interconnect of the chip 400 to a network interface device 403 (shown in FIG. 4 as the "EPC" (i.e. Ethernet Port Controller)). The network interface device 403 is referred to hereafter as the NIC 403. The NIC 403 performs link layer protocol processing to encapsulate the Elink packets into one or more data frames and dispatches those data frames over the network 401. In this way, the Elink packets are tunnelled over the Ethernet network 401 in Ethernet frames. These frames form a flow of connection traffic for which the network interface 403 ensures reliable delivery, by retransmitting data frames if successful transmission is not verified by the destination device. An example Ethernet frame 100b forming part of the connection traffic is shown in FIG. 3B.

The NIC 403 also functions to receive data frames comprising one or more Elink packets from the network 401 for delivery to one or more tiles 4 of the processing unit 2. When a data frame in which one or more Elink packets are encapsulated is received at the NIC 403, the NIC 403 performs the required link layer protocol processing to check the data frame for errors and to extract the Elink packets. The NIC 403 then dispatches these extracted Elink packets to the hardware module 402 of the processing unit 2. The hardware module 402 converts the Elink packets to the Tlink packet format and provides them to the appropriate destination tile 4 as indicated in the Elink packet headers.

The traffic transmitted between tiles 4 of different processing units 2 over the network 401 may be referred to as application traffic, since the payload content of the Elink packets comprises application data related to the distributed application running on different processing units 2 connected over the network 401. The application data may comprise input data for calculations to be performed by execution units of destination tiles 4 to which the application data is sent and/or may comprise results of processing by source tiles 4 from which the application data is sent.

Another data processing component of the device 400 is a processor 404, which is referred to herein as the management CPU (MCPU). The MCPU 404 is also able to send and receive data over the network 401 using the NIC 403, but via a different mechanism to that used by the processing unit 2. The MCPU 404 implements a driver functionality for sending and receiving data over the network 401 via NIC 403. In order to send data over the network 401, the MCPU 404 dispatches one or more Elink data packets over the interconnect of the device 400 to the NIC 403. The one or more Elink data packets comprise writes of data to a buffer of the network interface 403. More specifically, these Elink packets comprise writes of part of a data frame to a buffer of the NIC 403. The part of the data frame written to the buffer by the Elink packets comprises a payload and part of a frame header for a data frame. The part of the frame header written by the MCPU 404 to the NIC 403 buffer includes the destination address, the source address, and the EtherType fields of the frame header. After receiving and storing the payload and these parts of the frame header from the MCPU 404, the NIC 403 generates the FCS for the frame and appends this as the frame tail 103. The NIC 403 also adds the remaining parts of the frame header, i.e. the preamble and SFD. Once the NIC 403 has completed the data frame, it then causes the data frame to be dispatched over the network 401 to be sent to the destination device as identified in the frame header. This mechanism by which the MCPU 404 sends data over the network 401 may be referred to herein as the datagram send mechanism (with the frames being referred to as datagram frames), reflecting that the data frames are sent in accordance a connectionless protocol. This protocol could be UDP, with the data frames sent by the NIC 403 in accordance with the datagram send mechanism taking the form of the example data frame 100 shown in FIG. 3A. However, other datagram protocols may alternatively be used. The application data contained in a test data frame could take many different forms, but is preferably optimised for causing a large number of transitions in the circuitry of the network 401 so as to expose that circuitry to the highest possible stress, and hence test the network 401 most effectively.

On the receive side, a datagram frame received from over the network 401 and for delivery to the MCPU 404 is stored in the NIC 403. The NIC 403 checks the frame for errors using the FCS of the frame. If the frame passes the check (i.e. no errors are detected for the frame), the NIC 403 signals the MCPU 404. In response, the MCPU 404 issues one or more read requests (in the form of Elink packets) over the interconnect of the device 400 to the NIC 403 to read at least the payload of the frame from a buffer in the NIC 403. This mechanism may be referred to as the datagram receive mechanism.

According to embodiments of the application, the MCPU 404 provides part of the header and the full payload for a test data frame, which is to be sent over the network 401 by the NIC 403 a plurality of times. The MCPU 404 provides these parts of the test data frame, by issuing writes to write these parts of the test data frame to a buffer in the NIC 403. The NIC 403 completes the frame by adding the FCS and the remaining part of the header (i.e. the preamble and SFD). The NIC 403 comprises a send count register indicating a number of times the test frame is to be dispatched over the network 401. The NIC 403 causes this same test data frame to be sent over the network 401 the number of times indicated in the send count register. In this way, a large number of test data frames may be sent from the NIC 403 without making use of protocol processing resources at the NIC 403 each time a test data frame is sent. Such protocol processing resources are then available for use for the sending of further traffic (e.g. application traffic provided by the processing unit 2 or additional datagram traffic provided by the MCPU 404) over the network. Furthermore, the MCPU 404 itself is not occupied in providing new test data frames repeatedly, since it is sufficient for it to provide the test data frame once, with that test data frame then being repeatedly sent over the network 401. Therefore, the sending of test traffic can operate independently and in parallel with local application processing and without preventing other outgoing traffic from using the same NIC 403.

On the receive side, the NIC 403 may receive test data frames from another device accessible over the network 401. The test data frames may be constructed and sent from the other device, in the same manner as the test data frames sent by the NIC 403 (i.e. the test data frames received at the device may be copies of a same test data frame. The NIC 403 comprises a receive count register for counting the number of test data frames received from the network 401 correctly (i.e. for which no errors are detected). When the NIC 403 receives a test data frame, the NIC 403 checks the frame for errors using the FCS of the frame. If the NIC 403 determines that the frame comprises no errors, the NIC 403 updates the receive count register to indicate that a test data frame has been correctly received. After updating the receive count register, the NIC 403 then disposes of the test data frame. The test data frame does not need to be provided to the MCPU 404, and so processing resources of the MCPU 404 are not consumed by processing received test data frames. The receive count register provides statistics indicating the number of data frames received from the network 401 without error. This number can be compared to the number of test frames sent from the transmitting device to determine the number of frames transmitted over the network 401 without error.

Figure 5:
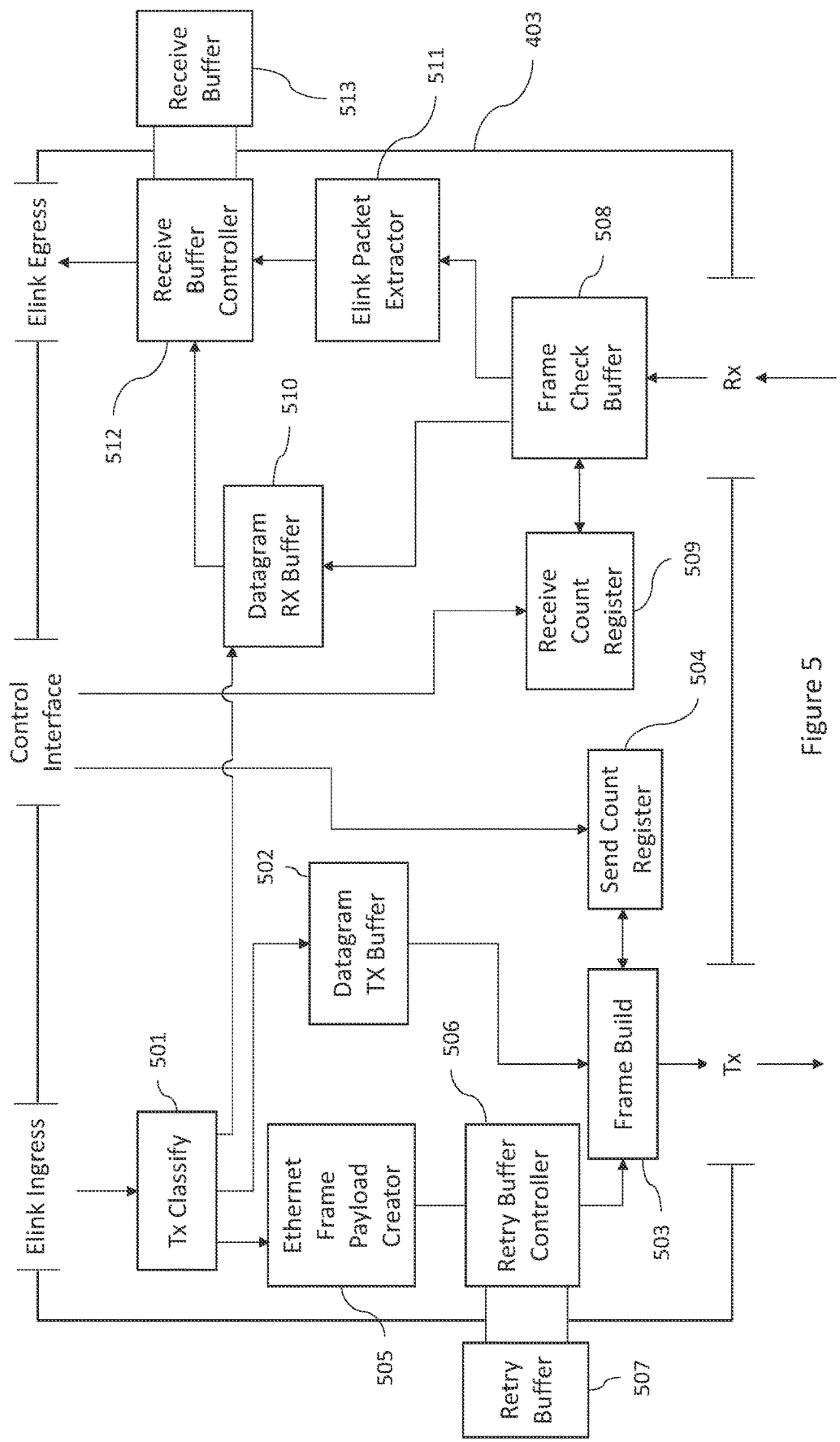
FIG. 5 illustrates example circuitry of a network interface device.

Reference is made to FIG. 5, which illustrates the circuitry of the NIC 403 in more detail. Each of the blocks shown in FIG. 5, and described as being for performing processing operations, comprises appropriate circuitry for performing the operations described. Furthermore, the NIC 403 comprises additional circuitry, other than the blocks shown in FIG. 5, for performing any additional operations described below as being performed by the NIC 403. References below to operations performed by the NIC 403 are to be understood as referring to operations performed by the circuitry of the NIC 403. The circuitry of the NIC 403 may comprise one or more field programmable gate arrays (FPGA) and/or one or more application specific integrated circuits (ASIC). Additionally or alternatively, the circuitry of the NIC 403 may comprise one or more processors configured to execute computer readable instructions to perform the operations described herein as being performed by the NIC 403 or by circuitry of the NIC 403. The circuitry of the NIC 403 may also be referred to as processing circuitry.

The NIC 403 comprises an interface (labelled as Elink Ingress) for receiving Elink packets from the data processing components (i.e. processing unit 2 and MCPU 404) of the device 400. These Elink packets may be writes from the MCPU 404 to the datagram transmit buffer 502 of the NIC 403. Alternatively, the packets may be Elink packets received from the processing unit 2 and for being encapsulated and dispatched over the network 401 in a data frame.

The NIC 403 comprises circuitry (represented as Tx Classify 501 in FIG. 5) for classifying the traffic received from over the Elink ingress. Each Elink packet received at the Elink ingress port includes a destination ID field. This destination ID field indicates which component (i.e. a buffer or register) of the NIC 403 is targeted by the Elink packet. The Tx classify 501 component may, when it receives an Elink write packet, in dependence upon the indication in the Elink packet header, provide this write to either the Ethernet Frame Payload Creator 505 or to the datagram Tx buffer 502. The processing unit 2 provides the Elink write packets targeting the Ethernet Frame Payload Creator 505, whilst the MCPU 404 provides the Elink write packets targeting the Datagram Tx buffer 502.

When the Tx classify circuit 501 identifies a series of Elink packets as being writes targeting the datagram transmit buffer 502, circuitry of the NIC 403 causes the payload data in these writes to be written to the datagram TX buffer 502. The headers of these Elink packets are discarded. The payload data from the Elink packets that is written to the buffer 502 may comprise parts of any arbitrary data frame. An example data frame 100a that may be partially written to the buffer 502 is shown in FIG. 3A. The parts of the data frame (i.e. the payload 101a and most of the header 102) written to the buffer 502 would be provided in the payloads of a plurality of Elink packets.

Some of the data frames written to the buffer 502 by the MCPU 404 are test data frames for testing the connections in the network 401. Others are for dispatch to a corresponding MCPU on another device, e.g. for connection management purposes. The type of partial data frame for transmission over the network 401 is indicated by the EtherType field in the header of the data frame. For example, the EtherType field may indicate that the data frame is a test data frame. Alternatively, the EtherType field may indicate that the data frame is a data frame for connection management or some other purpose.

The NIC 403 comprises frame build circuitry 503 that is configured to generate the FCS for the partial data frames held in the buffer 502. The frame build circuitry 503 also examines the EtherType field in the header of the frame. If the EtherType field indicates that a data frame from buffer 502 is of a type other than test traffic, the frame builder 503, after adding the FCS field for the data frame and completing the header, causes the data frame to be sent over the network 401 a single time. If the EtherType field indicates that a data frame from the buffer 502 is a test data frame, the frame builder 503, after adding the FCS of the data frame and completing the header, causes the test data frame to be sent over the network 401 a plurality of times. Each time a copy of the data frame is sent over the network 401, the send count register is decremented by circuitry of the NIC 403. Circuitry of the NIC 403 continues to send copies of the test data frame over the network until the send count register 504 reaches zero. The completed test data frame may be held in a buffer of the frame build circuitry 503, whilst multiple copies of it are transmitted over the network 401.

The send count register 504 may be written from over a control interface of the NIC 403. The MCPU 404 has permission to write to the register 504. In order to cause a test data frame provided by the MCPU 404 to the NIC 403 to be transmitted over the network 401 a specified number of times, the MCPU 404 writes that specified number of times to the send count register 504 over the control interface of the NIC 403. The NIC 403 then causes the test data frame to be sent over the network 401 that specified number of times.

If the Tx classify circuitry 501 identifies received Elink data packets as targeting the Ethernet frame payload creator 505, circuitry of the NIC 403 causes those received Elink data packets to be stored in a buffer associated with the Ethernet Frame Payload Creator circuitry 505. These Elink packets targeting the Ethernet Frame Payload Creator circuitry 505 are for sending over the network 401 as connection traffic. The Ethernet Frame Payload Creator circuit 505 concatenates these received Elink data packets to form a payload for a data frame. This concatenation may comprise padding one or more of the Elink packets, such that the payload of each Elink packet is a multiple of 16 bytes. The resulting Ethernet frame payload is provided to the frame builder 503, which encapsulates the payload into an Ethernet frame by adding the header and the footer. The frame builder 503 then causes the frame to be transmitted over the network 401.

The payload provided by the Ethernet frame payload creator 505 to the frame builder 503 is sent via a retry buffer controller 506, which comprises circuitry for storing that payload in a retry buffer 507. That payload is then available in the retry buffer 507 for retransmission, should such retransmission from the NIC 403 be required. The payloads sent via this mechanism are sent via a connection oriented protocol, which provides for reliable transmission by providing for retransmission using buffer 507 when frame transmission fails.

The sending of multiple copies of a test data frame can occur simultaneously with the processing and sending of the connection traffic received from the processing unit 2. Since the sending of the same copy of a test data frame multiple times does not require network protocol processing to be performed by the frame builder 503, the protocol processing resources are available for performing the link layer processing (i.e. constructing and adding the frame headers and footers) of the connection traffic. Thus, during a time period in which multiple copies of a test data frame are being dispatched from the NIC 403, the frame builder 503 may perform link layer processing of multiple payloads provided by the Ethernet frame payload creator 505 to form multiple frames that are dispatched from the NIC 403 during that time period. In other words, the transmit protocol processing and dispatch of the connection traffic occurs in parallel with the sending of multiple copies of the test data frame. The NIC 403 intersperses (i.e. interleaves) frames of the connection traffic with the copies of the test data frame in the sequence of frames that it sends over the network 401. In this way, there is no interruption of the sending of normal data traffic by the NIC 403 whilst testing of the network 401 is underway.

On the receive side, when a data frame is received from the network 401 at the NIC 403, that data frame is provided to the frame check buffer 508. Circuitry of the NIC 403 causes the data frame to be checked using the FCS contained in the frame. If the frame does not pass the check, the circuitry discards the frame. If the frame does pass the check, the action taken by the NIC 403 depends upon the EtherType of the frame.

If the EtherType indicates that the frame is a test data frame and the check using the FCS passed, the circuitry of the NIC 403 causes the value in the receive count register 509 to be updated to indicate that a test frame has been reliably received. The NIC 403 then discards the test frame.

If the EtherType indicates that the frame is a datagram frame, but not a test data frame, the circuitry of the NIC 403, if the check using the FCS passes, causes the frame to be written to the datagram receive buffer 510. Circuitry of the NIC 403 then provides a signal over the control interface to the MCPU 404 indicating that a data frame is available in the buffer 510. In response, the MCPU issues Elink read request packets, which are received at the Elink Ingress interface. The Tx classify circuitry 501 identifies these read request packets as targeting the datagram receive buffer 510 and consequently, circuitry of the NIC 403 causes the data frame held in the buffer 510 to be read out of the buffer 510 over the Elink Egress interface and provided to the MCPU 404.

If the EtherType indicates that the frame belongs to the connection traffic, and if the check using the FCS passes, circuitry of the NIC 403 causes an acknowledgment (ACK) that the frame was successfully received to be sent to the source device of the frame. This prevents the source device from retransmitting the frame. Additionally, that frame is provided from the Frame check buffer 508 to the Elink packet extractor circuitry 511, which extracts from the frame, the plurality of Elink packets contained in the payload of the frame. These are provided to the receive buffer controller circuit 512, which has an associated receive buffer 513 for buffering Elink packets prior to dispatch of these packets over the Elink egress interface of the NIC 403. The receive buffer controller 512 causes the extracted Elink packets provided by the Elink packet extractor 511 to be sent over the interconnect of the device 400 to the processing unit 2 for delivery to one of the tiles 4 of that processing unit 2. Together the steps of checking the FCS of a frame of the connection traffic and extracting the Elink packets from the frame constitute link layer protocol processing performed with respect to these frames on the receive side.

The receipt of the test data frames can occur in parallel with the receipt and processing of the connection traffic from the network 401. Since, for each test frame, the NIC 403 only needs to perform the error correction check before discarding the test frame, the processing resources of the NIC 403 are available for performing the additional link layer processing (i.e. extracting the data packets from the payload) that is required for the connection traffic. Additionally, the buffer capacity in the receive buffer 513 is available for storing the extracted packets. Thus, during a time period in which multiple test data frames are being received at the NIC 403, the NIC 403 may receive and perform link layer processing for frames of the connection traffic. In other words, the receipt and processing of the test traffic may be performed in parallel with the receipt and processing of the frames of the connection traffic. The test data frames are interspersed (i.e. interleaved) with the frames of the connection traffic in the sequence of frames received at the NIC 403. In this way, the NIC 403 is receives and processes the normal data traffic, whilst testing of the network 401 is underway.

Additionally, storage (in datagram RX buffer 510) and processing capacity (e.g. of the receive buffer controller 512) is available for handing the receipt of further datagram traffic (e.g. traffic relating to connection management) in parallel with handling the received test data frames. Therefore, the test data frames are interspersed (i.e. interleaved)

with these additional datagrams of the further datagram traffic in the sequence of frames received at the NIC 403.

The embodiment illustrated in FIG. 5 is an embodiment in which the datagram transmit buffer 502 is used for storing test data frames in addition to storing other types of datagram traffic. In other embodiments, separate buffers may be provided, with one buffer being used for storing test data frames and the other buffer being used for storing other types of datagram traffic. In this way, parallel sending between different types of datagram traffic (i.e. test datagram traffic and other datagram traffic) is enabled.

Figure 6:
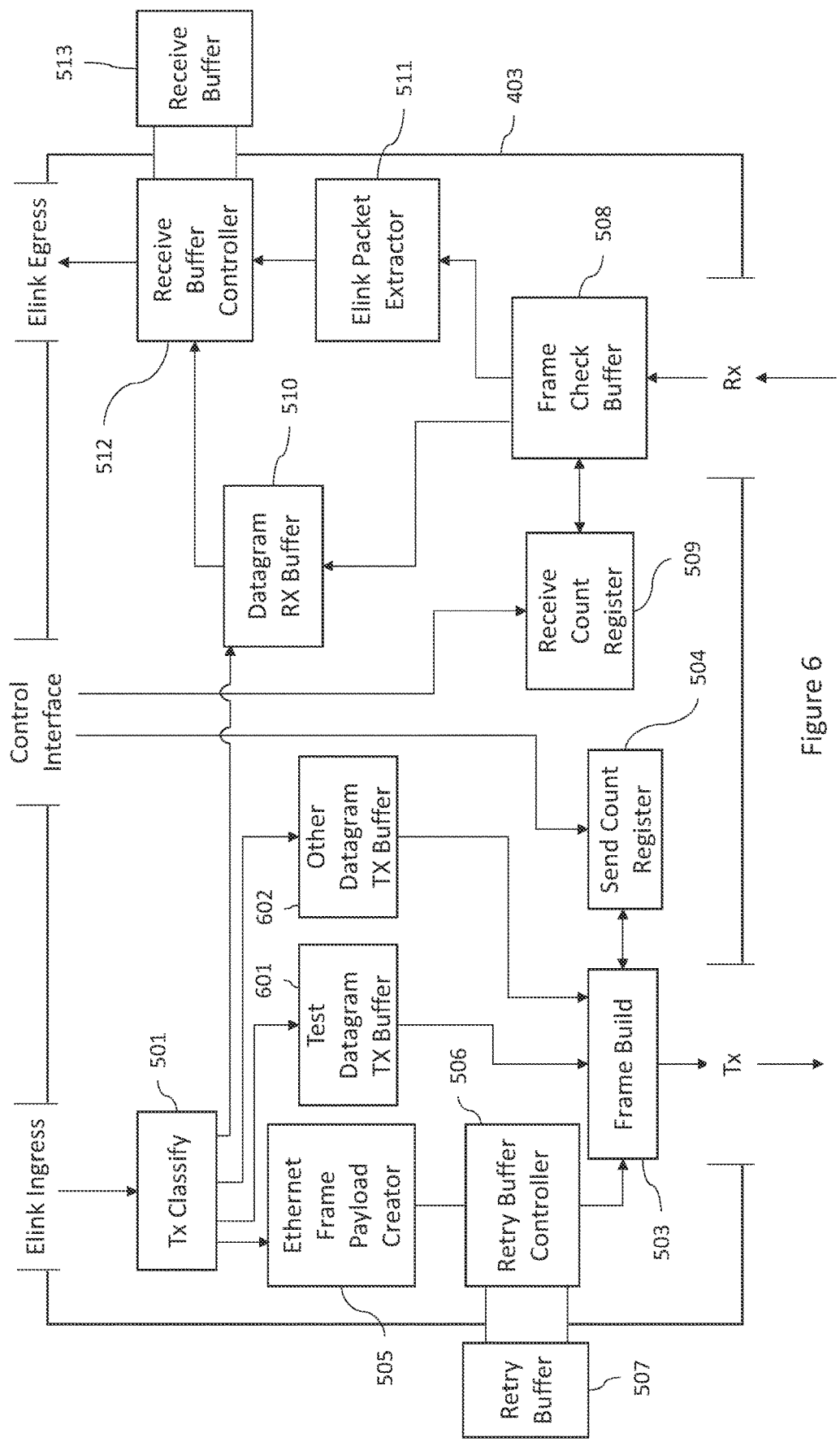
FIG. 6 illustrates example circuitry of a network interface device.

Reference is made to FIG. 6, which illustrates an embodiments in which two separate buffers are provided for storing datagram traffic for dispatch over the network 401. The other components shown in FIG. 6 operate in the same manner as described above with respect to FIG. 5. The first of these is the test datagram Tx buffer 601, which receives and stores a partial test data frame written by the MCPU 404. As described above with respect to FIG. 5, the frame builder 503 completes these frames by adding the FCS bits and completing the header and then causes multiple copies of the frame to be sent over the network 401. The second of the buffers 602 is the other datagram transmit buffer 602, which is used for transmitting datagram frames (e.g. for connection management), other than test frames. This buffer 602 stores partial data frames written by the MCPU 404 prior to transmission of those frames over the network 401. The frame builder 503 completes these other datagram frames by adding the FCS and completing the header and causes them to be sent over the network 401 a single time.

The sending of the other datagram traffic from buffer 601 and the sending of the copies of the test data frame occur in parallel. The NIC 403 intersperses (i.e. interleaves) the sending of the other datagram traffic from buffer 601 with the sending of the copies of the test data frame. Therefore, the sending of the other datagram traffic continues whilst the testing is underway.

FIGS. 5 and 6 illustrate an embodiment in which the NIC 403 includes a single receive count register 509 used for counting test traffic received from a single source device. However, in some embodiments multiple such receive count registers 509 may be provided, with each such register 509 being used for counting the test data frames received from a different source device. In this case, after performing the FCS check for a test data frame received at the NIC 403 and determining that that test data frame is without error, the NIC 403 updates the value held in the receive count register 509 associated with the source device from which the test data frame originated. The source device from which the test data frame originated may be identified based on the source ID in the header of the frame. In this way, the NIC 403 may be used for simultaneously testing multiple different paths in the network 401.

Figure 7:
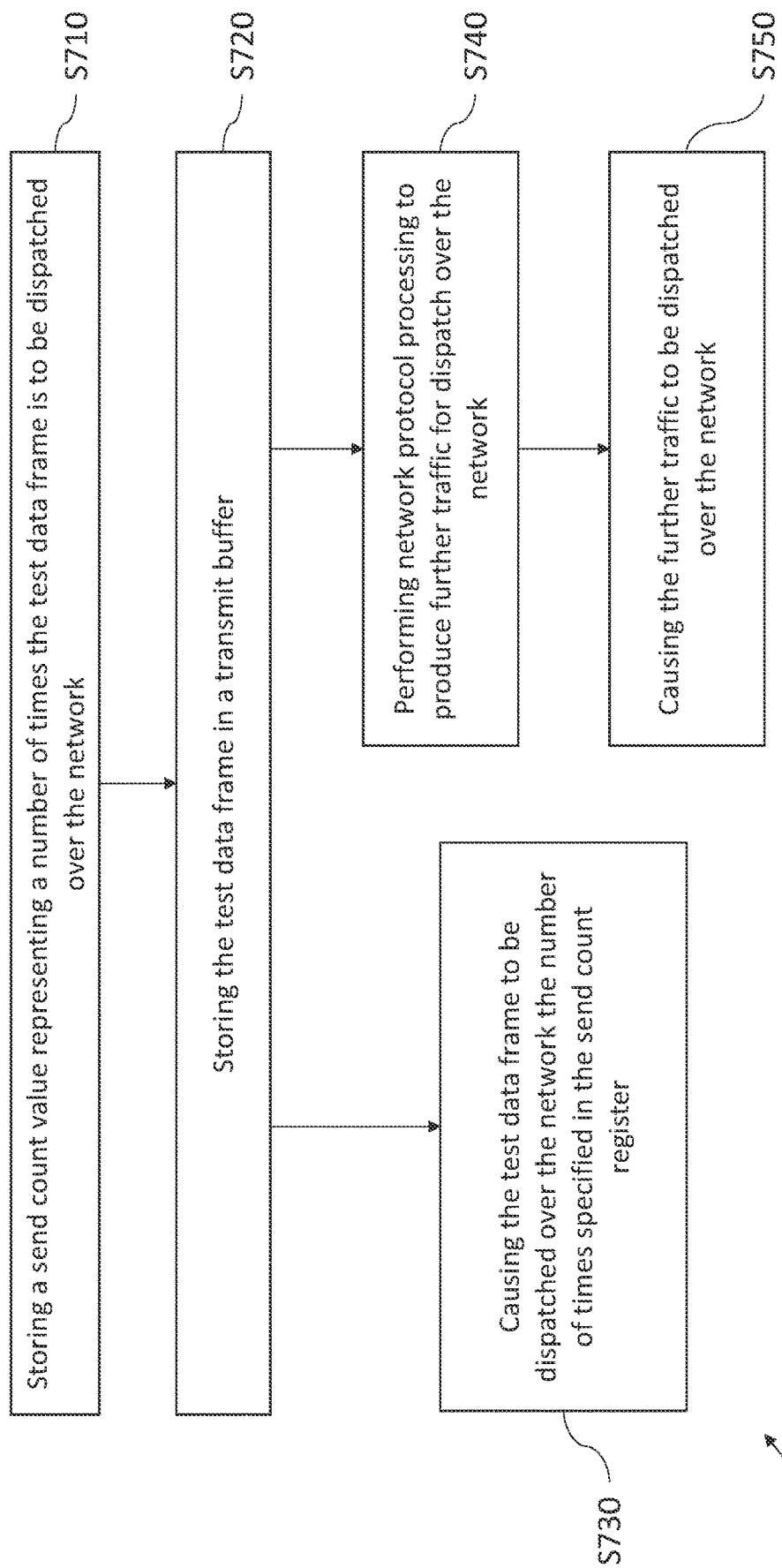
FIG. 7 illustrates an example method for supplying test traffic to a network.

Reference is made to FIG. 7, which illustrates a method 700 for testing the network 401 whilst transmitting further traffic over the network 401.

At S710, a send count value is stored in the send count register 504. The send count value represents the number of times a test data frame is to be dispatched over the network.

At S720, the test data frame is stored in a transmit buffer of the NIC 403.

At S730, the NIC 403 dispatches the test data frame over the network. The NIC 403 dispatches the test data frame the number of times represented by the send count value.

At S740, the NIC 403 performs network protocol processing to produce further traffic for dispatch over the network 401.

At S750, after performing the network protocol processing, the NIC 403 causes the further traffic to be dispatched over the network 401. At least some of the sending of the further traffic occurs prior to the dispatch of the test data frame over the network the number of times represented by the send count value. S730 and S750 overlap in time.

In the method 700, both of the steps S740 and S750 are performed in parallel with S730.

Figure 8:
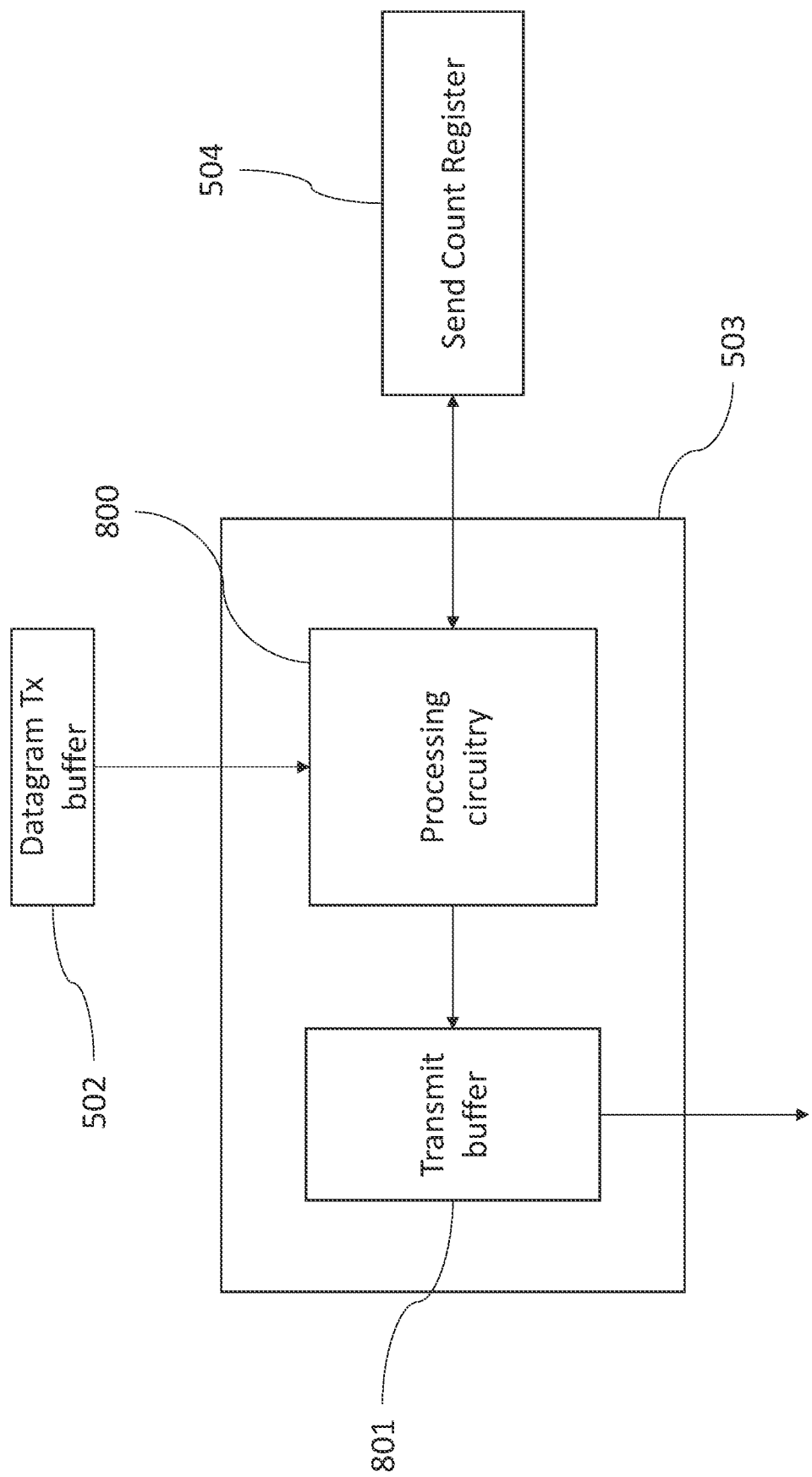
FIG. 8 illustrates an example of circuitry for implementing the method for supplying test traffic to a network.

Reference is made to FIG. 8, which shows components of the NIC 403 in which the steps of method 700 may be performed. FIG. 8 shows the components of the frame builder 503 in more detail.

The send count register 504 performs S710 of the method 700. The frame builder 503 comprises processing circuitry 800 for performing steps S730, S740, and S750. The frame builder 503 also comprises a transmit buffer for performing S720. The processing circuitry 800 completes the test data frame, parts of which are taken from the buffer 502, and stores the completed frame in buffer 801. Although the buffer 801 for holding the completed test data frame is shown as part of the frame builder 503, it is not excluded that this buffer 801 could be located in another part of the NIC 403.

Figure 9:
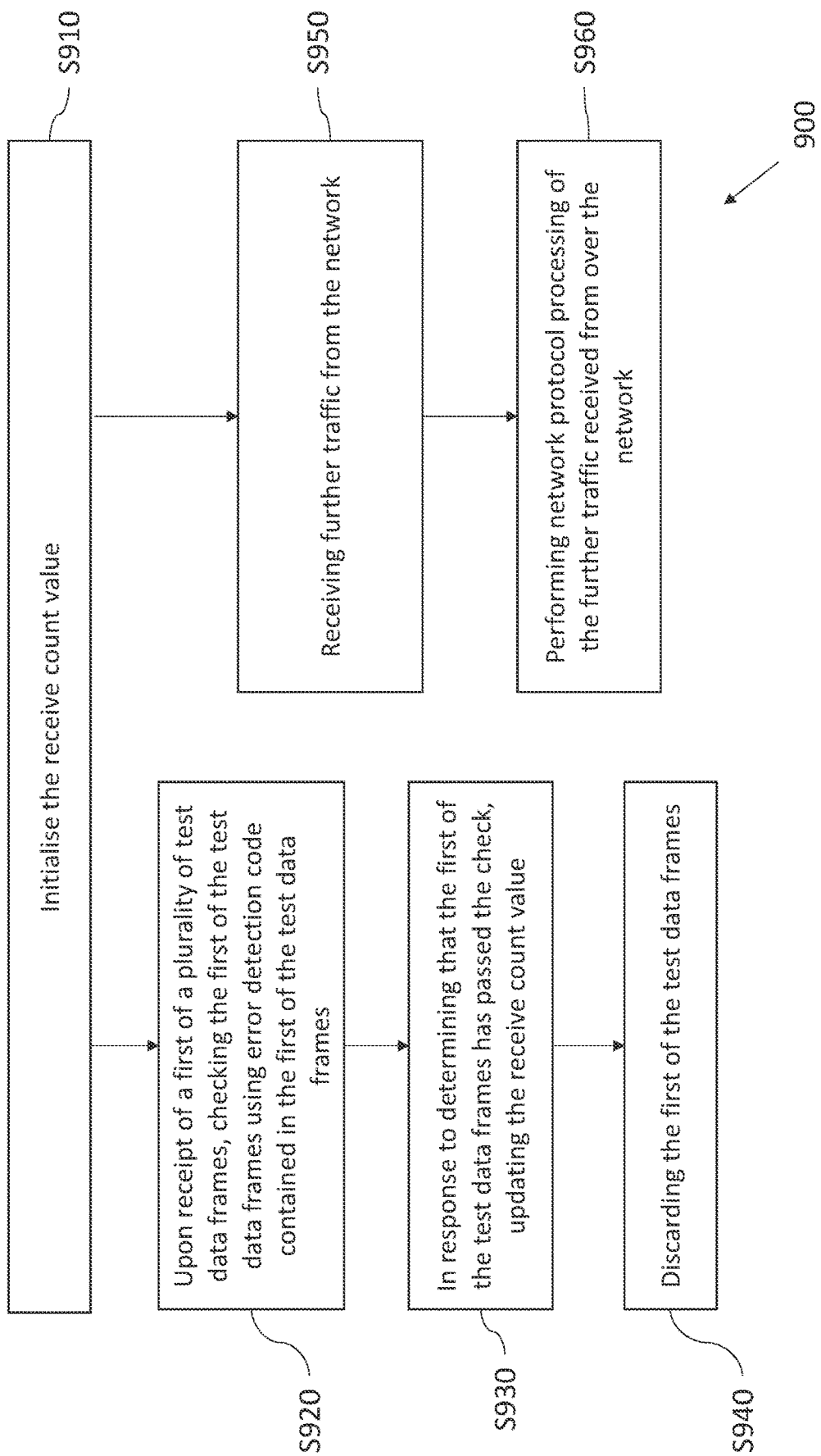
FIG. 9 illustrates an example method for receiving test traffic from a network.

Reference is made to FIG. 9, which illustrates a method 900 for processing test traffic received from over the network 401, whilst also processing further traffic received from over the network 401.

At S910, the receive count value stored in the receive count register 510 is initialised to zero prior to the receipt of a plurality of test data frames from a particular source over the network 401.

At S920, upon receipt of a first of a plurality of test frames, the NIC 403 checks the first of the test data frames using error detection code contained in the first of the test data frames. It is noted that although the "first of the test data frames" is referred to as being the "first", embodiments are not limited to this data frame being the earliest of the plurality of data frames to be received at the NIC 403.

At S930, in response to determining that the first of the test data frames has passed the check, the NIC 403 updates the receive count value.

At S940, the NIC 403 discards the first of the test data frames.

At S950, the NIC 403 receives further traffic from over the network 401. The receipt of the further traffic overlaps with the receipt of the test data frames, such that at least one of the test data frames is received by the NIC 403 prior to receipt of all of the further traffic.

At S960, the NIC 403 performs protocol processing of the further traffic received from over the network 401.

When performing the method 900, the steps S920, S930 and S940 are performed in parallel with the steps S950 and S960.

It has been described that the NIC 403 of embodiments of the application is configured to communicate over a network 401 with one or more other devices. Each of these devices may comprise the same features as the device 400 on which the NIC 403 is implemented, including having a same network interface device having the same features as the NIC 403.

It has been described that the link layer protocol for communication over the network is Ethernet, but it is not excluded that in some embodiments a different protocol may be used. Similarly, it has been described that Elink packets are used for the on-chip communication on the device 400 and are encapsulated in frames for transmission over the network 401 as part of connection traffic. However, embodiments are not limited to the use of Elink packets for the purposes described.

It will be appreciated that the above embodiments have been described by way of example only. While particular embodiments have been described, other applications and variants of the disclosed techniques may become apparent to a person skilled in the art once given the disclosure herein.

The invention claimed is:

1. A network interface device for interfacing one or more data processing components with a network, the network interface device comprising:
a transmit buffer configured to store a test data frame for dispatch over the network for testing the network;
a send count register configured to store a send count value representing a number of times the test data frame is to be dispatched from the transmit buffer over the network; and
processing circuitry configured to:
cause the test data frame to be dispatched over the network the number of times specified in the send count register;
perform network protocol processing to produce further traffic for dispatch over the network; and
prior to completing the sending of the test data frame the number of times specified in the send count register, cause the further traffic to be dispatched over the network,
wherein the causing the test data frame to be dispatched comprises causing a first instance of the test data frame to be dispatched while the network protocol processing is being performed.

2. The network interface device of claim 1, wherein the network interface device comprises an interface connected to the one or more data processing components, wherein the interface is configured to receive at least part of the test data frame from a first data processing component of the one or more data processing components.

3. The network interface device of claim 2, wherein the receiving at least part of the test data frame from the first data processing component comprises receiving one or more write packets from the first data processing component, wherein the at least part of the test data frame is contained in payloads of the one or more write packets.

4. The network interface device of claim 2, wherein the at least part of the test data frame comprises:
a payload of the test data frame; and
at least part of a link layer header of the test data frame.

5. The network interface device of claim 1, wherein the further traffic comprises a plurality of datagrams, wherein the network interface device further comprises a second buffer configured to store the plurality of datagrams prior to the network protocol processing.

6. The network interface device of claim 5, wherein the interface is configured to receive each of the plurality of datagrams from the one or more data processing components.

7. The network interface device of claim 1, wherein the network interface device comprises an interface connected to the one or more data processing components, wherein the interface is configured to receive one or more write packets for forming frames of the further traffic, the network protocol processing including encapsulating the one or more write packets to form the frames of the further traffic.

8. The network interface device of claim 1, wherein the processing circuitry is configured to complete the test data frame by providing an error detection code for the test data frame.

9. The network interface device of claim 1, wherein the one or more data processing components comprises a processor, wherein the send count register is writable by the processor, and wherein the network interface device comprises an interface configured to receive at least part of the test data frame from the processor.

10. The network interface device of claim 1, wherein the test data frame comprises a datagram.

11. A network interface device for interfacing one or more data processing components with a network, the network interface device comprising:
a receive count register configured to store a receive count value representing a number of test data frames that have been correctly received from over the network; and
processing circuitry configured to:
upon receipt of a first of the test data frames, check the first of the test data frames using error detection code contained in the first of the test data frames;
in response to determining that the first of the test data frames has passed the check, update the receive count value;
after updating the receive count value for the first of the test data frames, discard the first of the test data frames;
receive further traffic from the network, wherein at least part of the further traffic is received after receipt of at least one of the test data frames; and
perform network protocol processing of the further traffic received from over the network,
wherein the receipt of the first of the test data frames occurs while the network protocol processing of the further traffic is being performed.

12. The network interface device of claim 11, wherein the processing circuitry is further configured to:
examine an indication in a header of the first of the test data frames, the indication indicating that the first of the test data frames is test traffic; and
in response to the indication, process the first of the test data frames as test traffic by updating the receive count value.

13. The network interface device of claim 12, wherein test data frames are Ethernet frames, wherein the indication in the header comprises an Ethertype, wherein the further traffic comprises frames of a different Ethertype.

14. The network interface device of claim 11, wherein each of the test data frames are copies of a same test data frame.

15. The network interface device of claim 11, wherein the further traffic comprises a plurality of datagrams.

16. The network interface device of claim 11, wherein the network protocol processing comprises link layer protocol processing to extract packets from frames of the further traffic.

17. The network interface device of claim 11, wherein each of the test data frames comprises a datagram.

18. The network interface device of claim 11, wherein the further traffic is connection oriented traffic.

19. The network interface device of claim 11, wherein network interface device is implemented in an integrated circuit, wherein the integrated circuit comprises the one or more data processing components.

20. A method for testing a network while transmitting further traffic over the network, the method implemented in a network interface device for interfacing one or more data processing components with the network, the method comprising:

storing a send count value representing a number of times a test data frame is to be dispatched from the network interface device over the network;

causing the test data frame to be dispatched over the network the number of times specified in the send count register;

performing network protocol processing to produce the further traffic for dispatch over the network; and prior to completing the sending of the test data frame the number of times specified in the send count register, causing the further traffic to be dispatched over the network, wherein the causing the test data frame to be dispatched comprises causing a first instance of the test data frame to be dispatched while the network protocol processing is being performed.

21. A non-transitory computer readable medium storing computer readable instructions, which when executed by a processor of a network interface device, cause a method for testing a network while transmitting further traffic over the network to be performed, the method comprising:

storing a send count value representing a number of times a test data frame is to be dispatched from the network interface device over the network;

causing the test data frame to be dispatched over the network the number of times specified in the send count register;

performing network protocol processing to produce the further traffic for dispatch over the network; and prior to completing the sending of the test data frame the number of times specified in the send count register, causing the further traffic to be dispatched over the network, wherein the causing the test data frame to be dispatched comprises causing a first instance of the test data frame to be dispatched while the network protocol processing is being performed.

22. A method for processing test traffic received from over a network, while also processing further traffic received from over the network, the method implemented in a network interface device for interfacing one or more data processing components with the network, the method comprising:

upon receipt of a first of a plurality of test data frames, checking the first of the test data frames using error detection code contained in the first of the test data frames;

in response to determining that the first of the test data frames has passed the check, updating a receive count value, the receive count value representing a number of the test data frames that have been correctly received from over the network, after updating the receive count value for the first of the test data frames, discarding the first of the test data frames;

receiving the further traffic from the network, wherein at least part of the further traffic is received after receipt of at least one of the test data frames; and performing network protocol processing of the further traffic received from over the network, wherein the receipt of the first of the test data frames occurs while the network protocol processing of the further traffic is being performed.

23. A non-transitory computer readable medium storing computer readable instructions, which when executed by a processor of a network interface device, cause a method to be performed for processing test traffic received from over a network, while also processing further traffic received over the network, the method comprising:

upon receipt of a first of a plurality of test data frames, checking the first of the test data frames using error detection code contained in the first of the test data frames;

in response to determining that the first of the test data frames has passed the checking, updating a receive count value, the receive count value representing a number of the test data frames that have been correctly received from over the network, after updating the receive count value for the first of the test data frames, discarding the first of the test data frames;

receiving the further traffic from the network, wherein at least part of the further traffic is received after receipt of at least one of the test data frames; and performing network protocol processing of the further traffic received from over the network, wherein the receipt of the first of the test data frames occurs while the network protocol processing of the further traffic is being performed.

* * * * *